(12) United States Patent
Fujiyoshi

(10) Patent No.: US 11,379,086 B2
(45) Date of Patent: Jul. 5, 2022

(54) PROXIMITY DETECTING DEVICE HAVING OBLIQUELY CROSSING DETECTION ELECTRODE GROUP

(71) Applicant: Alps Alpine Co., Ltd., Tokyo (JP)

(72) Inventor: Tatsumi Fujiyoshi, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/331,117

(22) Filed: May 26, 2021

(65) Prior Publication Data

US 2021/0278929 A1     Sep. 9, 2021

Related U.S. Application Data

(63) Continuation of application No. PCT/JP2019/043282, filed on Nov. 5, 2019.

(30) Foreign Application Priority Data

Nov. 27, 2018   (JP) .............................. JP2018-221574

(51) Int. Cl.
*G06F 3/044*     (2006.01)

(52) U.S. Cl.
CPC .......... *G06F 3/0445* (2019.05); *G06F 3/0446* (2019.05); *G06F 2203/04108* (2013.01)

(58) Field of Classification Search
CPC . G06F 2203/04108; G06F 2203/04101; G06F 3/0446; G06F 3/044; G06F 3/0445; G06F 3/041; G06F 3/04164
See application file for complete search history.

(56) References Cited

U.S. PATENT DOCUMENTS

| 8,749,503 | B2 | 6/2014 | Tanaka |
| 9,965,099 | B2 | 5/2018 | Yamada |

(Continued)

FOREIGN PATENT DOCUMENTS

| JP | 3-180922 | 8/1991 |
| JP | 2010-244347 | 10/2010 |

(Continued)

OTHER PUBLICATIONS

International Search Report from International Application No. PCT/JP2019/043282 dated Jan. 28, 2020.

*Primary Examiner* — Deeprose Subedi
(74) *Attorney, Agent, or Firm* — Beyer Law Group LLP

(57) ABSTRACT

A proximity detecting device includes: a first detection electrode group having detection electrodes; a second detection electrode group having detection electrodes that orthogonally cross the first detection electrode group; an obliquely crossing detection electrode group having detection electrodes that orthogonally cross the first and second detection electrode groups; a detector capable of detecting electrostatic capacitances of each of the first and second detection electrode groups and the obliquely crossing detection electrode group; and a controller that performs detection through switching between a first detection mode in which a proximity state of a detection-target object is determined based on the electrostatic capacitances of the first and second detection electrode groups and a second detection mode in which a proximity state of each of a plurality of detection-target objects is determined based on the electrostatic capacitances of the first and second detection electrode groups and the obliquely crossing detection electrode group.

6 Claims, 5 Drawing Sheets

(56) References Cited

U.S. PATENT DOCUMENTS

| | | |
|---|---|---|
| 10,521,044 B2 | 12/2019 | Fujisawa et al. |
| 2011/0069034 A1* | 3/2011 | Yokota .................. G06F 3/0446 |
| | | 345/174 |
| 2017/0139544 A1 | 5/2017 | Yamada |

FOREIGN PATENT DOCUMENTS

| | | |
|---|---|---|
| JP | 2011-18177 | 1/2011 |
| JP | 2011-64475 | 3/2011 |
| JP | 2012-8903 | 1/2012 |
| JP | 2017-4482 | 1/2017 |
| JP | 2018-151914 | 9/2018 |
| WO | 2016/021356 | 2/2016 |

* cited by examiner

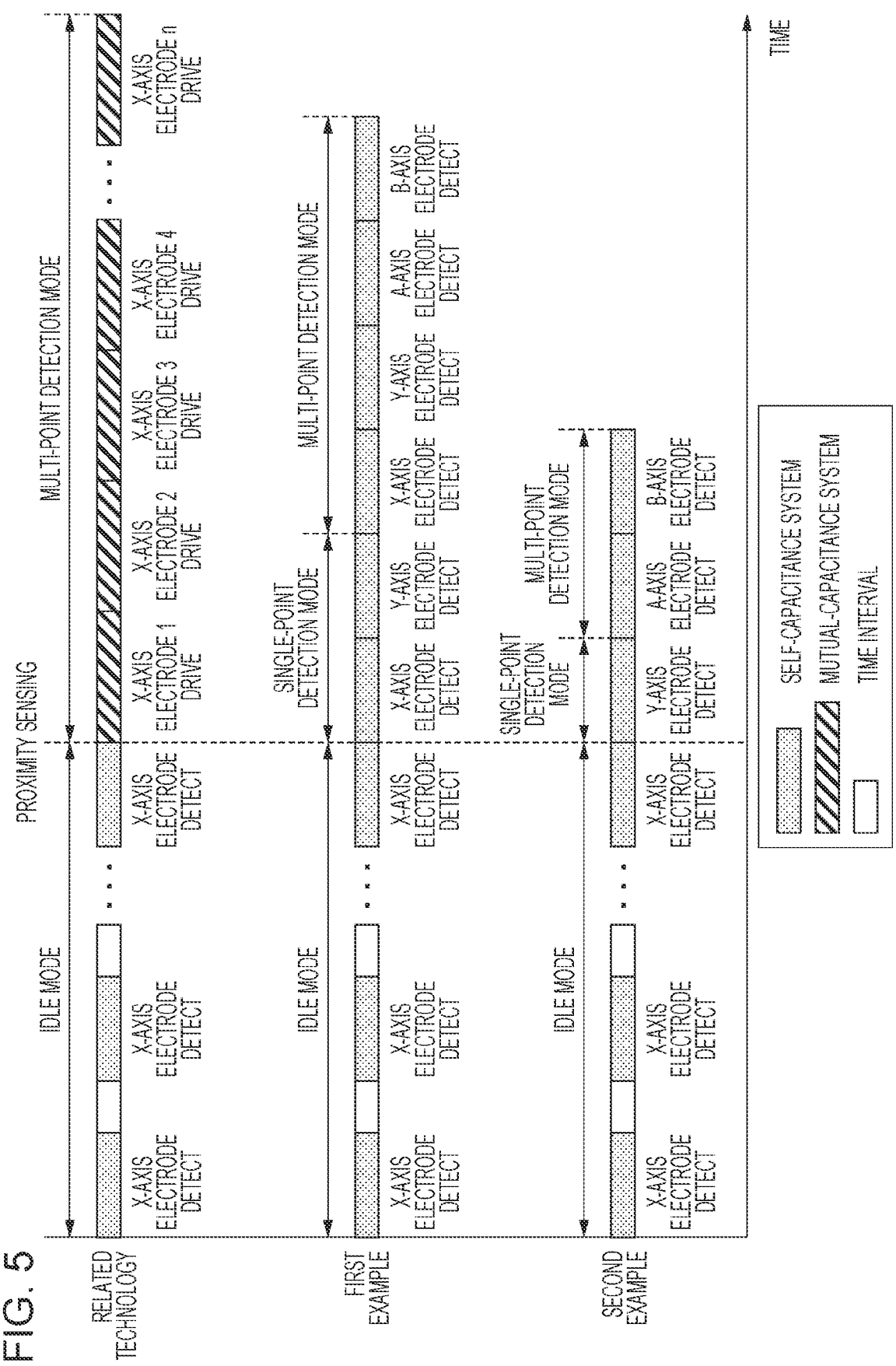

PROXIMITY DETECTING DEVICE HAVING OBLIQUELY CROSSING DETECTION ELECTRODE GROUP

CLAIM OF PRIORITY

This application is a Continuation of International Application No. PCT/JP2019/043282 filed on Nov. 5, 2019, which claims benefit of Japanese Patent Application No. 2018-221574 filed on Nov. 27, 2018. The entire contents of each application noted above are hereby incorporated by reference.

BACKGROUND OF THE INVENTION

1. Field of the Invention

The present invention relates to a proximity detecting device.

2. Description of the Related Art

A typical detecting device has a plurality of X-axis electrodes and a plurality of Y-axis electrodes that are arranged in a grid shape on its detection surface. In such a detecting device, a method in which a plurality of X-axis electrodes is driven at a time to collectively detect electrostatic capacitances of the X-axis electrodes as self-capacitances, and then a plurality of Y-axis electrodes is driven at a time to collectively detect electrostatic capacitances of the Y-axis electrodes as self-capacitances is employed to allow a detection-target object that is in close proximity to a detection surface to be detected at high speed. However, in this method, when the number of detection-target objects that are in close proximity to the detection surface is two or more, the so-called "ghost" occurs, and thus, there is a possibility that an erroneous proximity position is detected.

Accordingly, for example, a method in which X-axis electrodes are sequentially driven one by one, and each time one X-axis electrode is driven, electrostatic capacitances of the respective Y-axis electrodes are detected collectively (or sequentially) as self-capacitances is conceivable as a method for preventing erroneous detection as described above. With this method, even when the number of detection-target objects that are in close proximity to the detection surface is two or more, it is possible to correctly determine a proximity position of each of the detection-target objects. However, in this method, since detection sequences corresponding to the number of X-axis electrodes (or the "number of X-axis electrodes"×the "number of Y-axis electrodes") need to be sequentially executed, there is a possibility that each detection-target object cannot be detected at high speed.

Also, for example, International Publication No. WO2016/021356 (hereinafter referred to as "Patent Document 1") discloses a technology in which four electrodes that extend linearly in four mutually different directions (a vertical direction, a lateral direction, a direction that extends from the lower left to the upper right, and a direction that extends from the lower right to the upper left) are arranged in each section so as to cross each other, to detect that a finger or the like is in close proximity to the section upon occurrence of generally equal changes in electrostatic capacitances at the four electrodes.

However, in the technology in Patent Document 1, although a proximity position of a detection-target object can be detected with high accuracy, each of the four electrodes needs to be sequentially driven even for detecting close proximity of one detection-target object, and thus there is a possibility that a detection-target object cannot be detected at high speed.

SUMMARY OF THE INVENTION

A proximity detecting device according to one embodiment includes: a first detection electrode group having a plurality of detection electrodes; a second detection electrode group having a plurality of detection electrodes that orthogonally crosses the first detection electrode group; an obliquely crossing detection electrode group having a plurality of detection electrodes that obliquely crosses each of the first detection electrode group and the second detection electrode group; a detector capable of detecting electrostatic capacitances according to a proximity state of at least one detection-target object for each of the first detection electrode group, the second detection electrode group, and the obliquely crossing detection electrode group; and a controller that performs detection through switching between a first detection mode in which a proximity state of a detection-target object is determined based on the electrostatic capacitances of each of the first detection electrode group and the second detection electrode group and a second detection mode in which a proximity state of each of a plurality of detection-target objects is determined based on the electrostatic capacitances of each of the first detection electrode group, the second detection electrode group, and the obliquely crossing detection electrode group.

According to one embodiment, a proximity state of a detection-target object can be detected at high speed and with high accuracy.

BRIEF DESCRIPTION OF THE DRAWINGS

FIG. 5 is a chart for describing an advantage of the proximity detecting device according to one embodiment.

DESCRIPTION OF THE PREFERRED EMBODIMENTS

Embodiments

Embodiments of the present invention will be described below with reference to the accompanying drawings.

<Configuration of Proximity Detecting Device 100>

Figure 1:
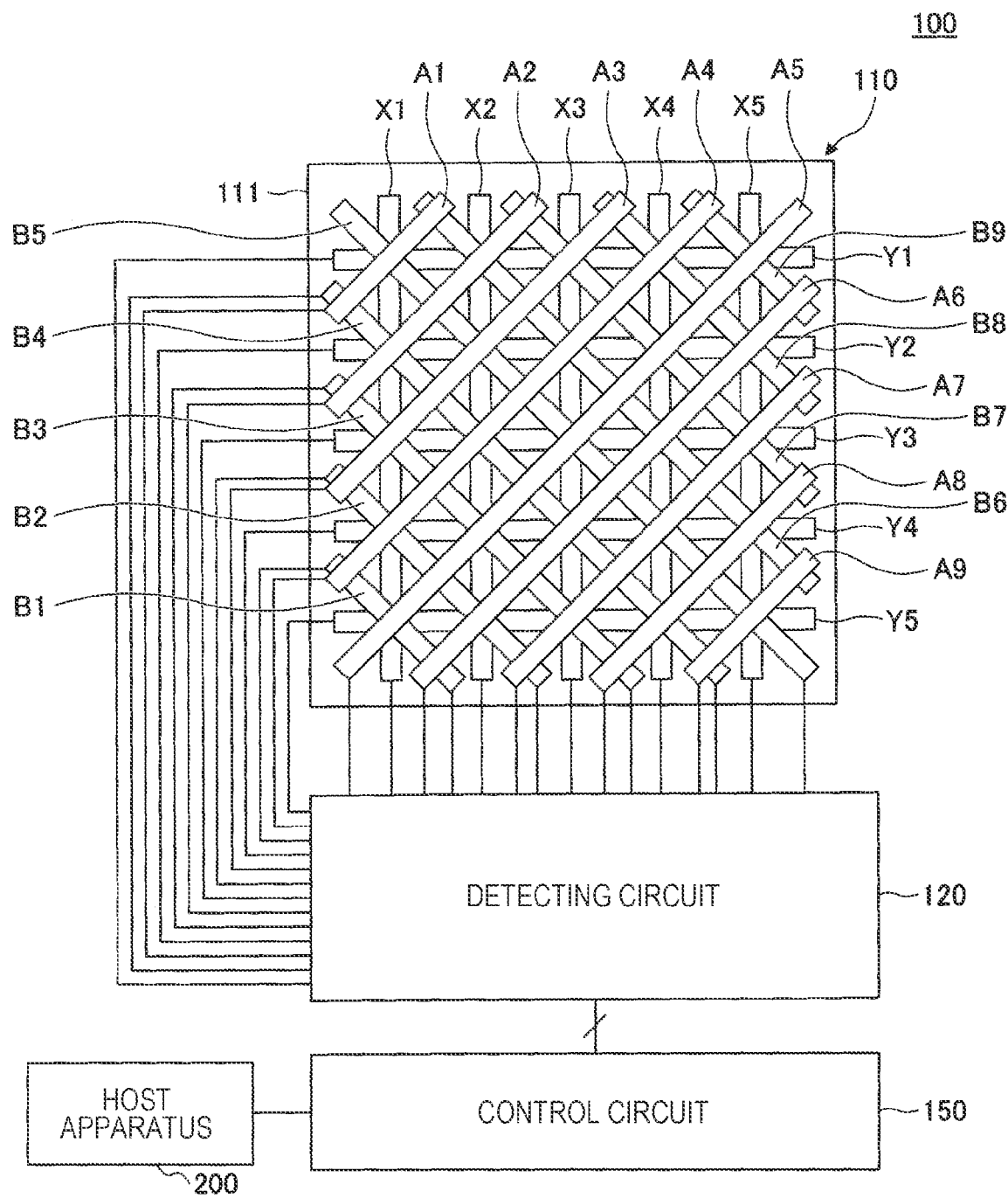
FIG. 1 is a diagram showing the configuration of a proximity detecting device according to one embodiment.

FIG. 1 is a diagram showing the configuration of a proximity detecting device 100 according to one embodiment. The proximity detecting device 100 shown in FIG. 1 includes a detecting unit 110, a detecting circuit 120, and a control circuit 150.

The detecting unit 110 is a device that can detect a proximity state of a detection-target object (for example, a finger) relative to a detection surface 111 having a generally square shape. In the present embodiment, the "detecting a proximity state of a detection-target object" is mainly detecting a proximity position (a position on a detection surface) of a detection-target object, but is not limited thereto, and may include detecting a proximity distance (a distance from a detection surface) or the like of a detection-target object.

As shown in FIG. 1, the detecting unit 110 includes a first detection electrode group X, a second detection electrode group Y, a third detection electrode group A, and a fourth detection electrode group B that are provided to overlap a detection surface 111.

The first detection electrode group X has a plurality of detection electrodes X1 to X5 that are arranged parallel to each other in an X-axis direction. Each of the detection electrodes X1 to X5 has a shape that extends in a Y-axis direction.

The second detection electrode group Y has a plurality of detection electrodes Y1 to Y5 that are arranged parallel to each other in the Y-axis direction and that orthogonally cross the first detection electrode group X. Each of the detection electrodes Y1 to Y5 has a shape that extends in the X-axis direction.

The third detection electrode group A is one example of an "obliquely crossing detection electrode group". The third detection electrode group A has a plurality of detection electrodes A1 to A9 that are arranged parallel to each other in the direction of an axis A (an axis that obliquely crosses each of the X-axis and Y-axis at an angle of 45 degrees) and that obliquely cross each of the first detection electrode group X and the second detection electrode group Y at an angle of 45 degrees. Each of the detection electrodes A1 to A9 has a shape that extends in a B-axis direction that orthogonally crosses the A-axis direction.

The fourth detection electrode group B is another example of the "obliquely crossing detection electrode group". The fourth detection electrode group B has a plurality of detection electrodes B1 to B9 that are arranged parallel to each other in the direction of the B axis (the axis that obliquely crosses each of the X-axis and the Y-axis at an angle of 45 degrees and that orthogonally crosses the axis A), that obliquely cross each of the first detection electrode group X and the second detection electrode group Y at an angle of 45 degrees, and that orthogonally cross the third detection electrode group A. Each of the detection electrodes B1 to B9 has a strip-like shape that extends linearly in the A-axis direction that orthogonally crosses the B-axis direction.

FIG. 1 is a schematic view, and in practice, detection electrode groups are realized in shapes that do not overlap each other as much as possible so that a detection sensitivity in the directions that are perpendicular to the detection surface 111 is ensured, as shown in Patent Document 1 (corresponds to U.S. Patent Application Publication No. 2017/0139544 A1 filed by the applicant).

As shown in FIG. 1, the detection electrodes X1 to X5, Y1 to Y5, A1 to A9, and B1 to B9 are connected to the detecting circuit 120. Upon application of an alternating-current voltage from the detecting circuit 120, each of the detection electrodes X1 to X5, Y1 to Y5, A1 to A9, and B1 to B9 is driven, and when an electrostatic capacitance thereof changes according to a proximity state of a detection-target object, a current value changes according to the change in the electrostatic capacitance. The electrostatic capacitance (that is, the current value according to the proximity state) of each of the detection electrodes X1 to X5, Y1 to Y5, A1 to A9, and B1 to B9 is detected by the detecting circuit 120. For example, a thin-film-shaped conductor, such as indium tin oxide (ITO), indium zinc oxide (IZO), a metal film (for example, silver, copper, or a composite of aluminum and molybdenum) can be used for each of the detection electrodes X1 to X5, Y1 to Y5, A1 to A9, and B1 to B9.

The detecting circuit 120 is one example of "detector". Upon detecting the electrostatic capacitance of each of the detection electrodes X1 to X5, Y1 to Y5, A1 to A9, and B1 to B9, the detecting circuit 120 detects proximity of the detection-target object relative to the detection surface 111. The detecting circuit 120 is electrically connected to each of the detection electrodes X1 to X5, Y1 to Y5, A1 to A9, and B1 to B9. The detecting circuit 120 drives each of the detection electrodes X1 to X5, Y1 to Y5, A1 to A9, and B1 to B9 by applying an alternating-current voltage thereto and detects the electrostatic capacitance of each of the detection electrodes X1 to X5, Y1 to Y5, A1 to A9, and B1 to B9. The detecting circuit 120 outputs the detected electrostatic capacitance (that is, the current value according to the proximity state) of each of the detection electrodes X1 to X5, Y1 to Y5, A1 to A9, and B1 to B9 to the control circuit 150. With respect to each of the detection electrodes X1 to X5, Y1 to Y5, A1 to A9, and B1 to B9, the detecting circuit 120 detects an electrostatic capacitance between the detection electrode and a detection-target object by using a self-capacitance system.

The control circuit 150 is one example of "controller". The control circuit 150 controls various operations of the proximity detecting device 100. For example, the control circuit 150 determines the proximity state of a detection-target object relative to the detection surface 111, based on a change in the electrostatic capacitance of each of the detection electrodes X1 to X5, Y1 to Y5, A1 to A9, and B1 to B9, the electrostatic capacitance being detected by the detecting circuit 120. For example, when the amount of change in the electrostatic capacitance of one detection electrode exceeds a predetermined threshold th, the control circuit 150 determines that a position on the detection electrode is a proximity position of the detection-target object. Also, for example, the detecting circuit 120 may determine a proximity distance of a detection-target object relative to the detection surface 111, in accordance with the amount of change in the electrostatic capacitance of each of the detection electrodes X1 to X5, Y1 to Y5, A1 to A9, and B1 to B9. The control circuit 150 then outputs data indicating the proximity state of the detection-target object to a host apparatus 200. Also, for example, the control circuit 150 switches among operation modes, which will be described below with reference to FIG. 2.

Based on the data output from the control circuit 150, the host apparatus 200 performs various types of application processing (for example, input processing, selection processing, movement processing, switching processing, enlargement processing, size-reduction processing, and gesture detection processing) in accordance with the proximity state (the proximity position, the proximity distance, or the like) of the detection-target object.

<Operation Modes of Proximity Detecting Device 100>

Figure 2:
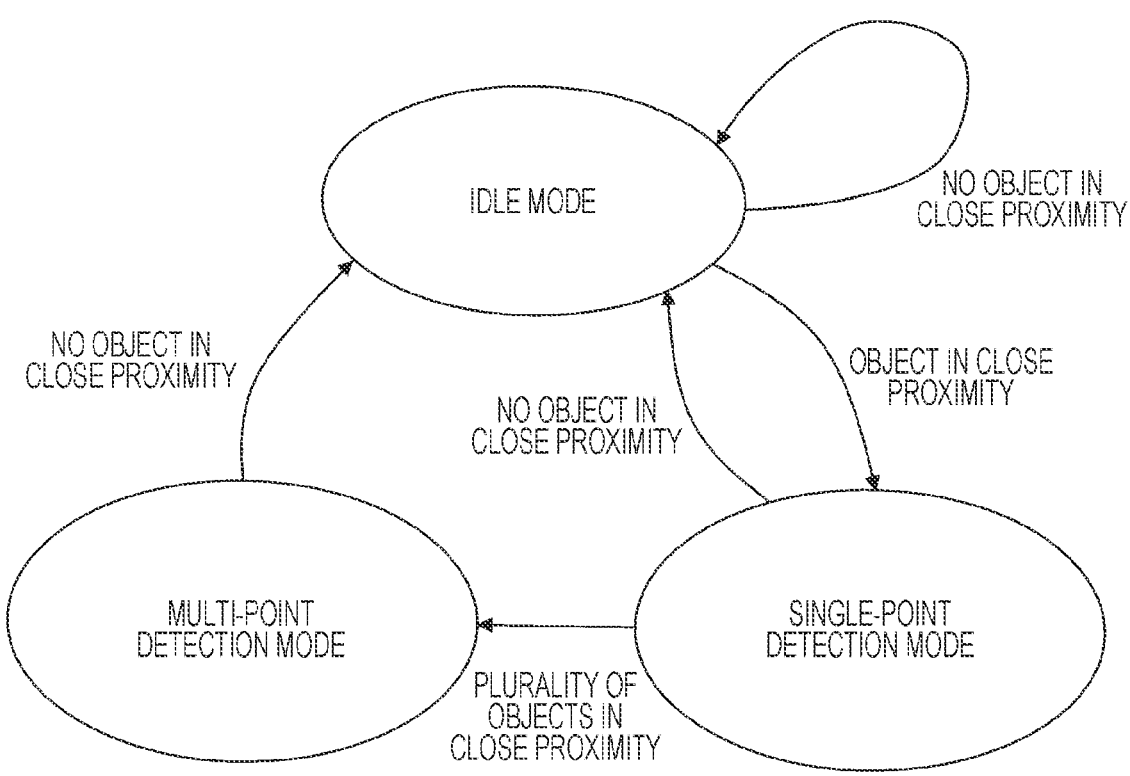
FIG. 2 is a state transition diagram of operation modes of the proximity detecting device according to one embodiment.

FIG. 2 is a state transition diagram of operation modes of the proximity detecting device 100 according to one embodiment. As shown in FIG. 2, the proximity detecting device 100 has an "idle mode", a "single-point detection mode", and a "multi-point detection mode" as the operation modes.

The "idle mode" is one example of a "third detection mode". The "idle mode" is an operation mode in a standby state. In the "idle mode", the detecting circuit 120 detects the electrostatic capacitances of only the first detection electrode group X. In this case, the detecting circuit 120 detects the electrostatic capacitances of the first detection electrode group X at a detection cycle having regular time intervals. In the "idle mode", the control circuit 150 determines whether or not a detection-target object is in close proximity to the detection surface 111, based on the electrostatic capacitances of the first detection electrode group X. In the "idle mode", it is sufficient to detect that a detection-target object is in close proximity at any of the detection electrodes X1 to X5 by using only the first detection electrode group X, and thus, an accurate proximity position of the detection-target object is not determined. In the "idle mode", since the electrostatic capacitances are detected with only the first detection electrode group X, the amount of time taken for detecting the electrostatic capacitances can be reduced, and power consumed for detecting the electrostatic capacitances can be reduced, compared with the "single-point detection mode" and the "multi-point detection mode".

The "single-point detection mode" is one example of a "first detection mode". In the "single-point detection mode", the control circuit 150 determines a proximity state of one detection-target object relative to the detection surface 111, based on the electrostatic capacitances of the first detection electrode group X and the second detection electrode group Y. For example, in the "single-point detection mode", the detecting circuit 120 detects the electrostatic capacitances of each of the first detection electrode group X and the second detection electrode group Y. Specifically, first, the detecting circuit 120 drives the first detection electrode group X to detect the electrostatic capacitances of the respective detection electrodes X1 to X5. Next, the detecting circuit 120 drives the second detection electrode group Y to detect the electrostatic capacitances of the respective detection electrodes Y1 to Y5.

Based on the electrostatic capacitances of the respective detection electrodes X1 to X5, the control circuit 150 determines a position in the X-axis direction where the amount of change in the electrostatic capacitances reaches a peak as an X coordinate of the proximity position of the detection-target object. Also, based on the electrostatic capacitances of the respective detection electrodes Y1 to Y5, the control circuit 150 determines a position in the Y-axis direction where the amount of change in the electrostatic capacitances reaches a peak as a Y coordinate of the proximity position of the detection-target object. Thus, the detecting circuit 120 determines the X coordinate and the Y coordinate that indicate the proximity position of one detection-target object relative to the detection surface 111. In the "single-point detection mode", since the third detection electrode group A and the fourth detection electrode group B are not used, the amount of time taken for detecting the electrostatic capacitances can be reduced, and power consumed for detecting the electrostatic capacitances can be reduced, compared with the "multi-point detection mode".

The "multi-point detection mode" is one example of a "second detection mode". In the "multi-point detection mode", the control circuit 150 determines proximity states of respective detection-target objects relative to the detection surface 111, based on the electrostatic capacitances of the first detection electrode group X, the second detection electrode group Y, the third detection electrode group A, and the fourth detection electrode group B. For example, in the "multi-point detection mode", the detecting circuit 120 detects the electrostatic capacitances of the first detection electrode group X, the second detection electrode group Y, the third detection electrode group A, and the fourth detection electrode group B. Specifically, first, the detecting circuit 120 drives the first detection electrode group X to detect the electrostatic capacitances of the respective detection electrodes X1 to X5. Next, the detecting circuit 120 drives the second detection electrode group Y to detect the electrostatic capacitances of the respective detection electrodes Y1 to Y5. Next, the detecting circuit 120 drives the third detection electrode group A to detect the electrostatic capacitances of the detection electrodes A1 to A9. Next, the detecting circuit 120 drives the fourth detection electrode group B to detect the electrostatic capacitances of the respective detection electrodes B1 to B9.

Based on the electrostatic capacitances of the detection electrodes X1 to X5, Y1 to Y5, A1 to A9, and B1 to B9, the control circuit 150 determines the proximity states of the detection-target objects relative to the detection surface 111. Specifically, first, based on the electrostatic capacitances of the respective detection electrodes X1 to X5, the control circuit 150 identifies positions in the X-axis direction where the amounts of change in the electrostatic capacitances reach peaks as the X coordinates of the proximity positions of detection-target objects. Next, based on the electrostatic capacitances of the respective detection electrodes Y1 to Y5, the control circuit 150 identifies positions in the Y-axis direction where the amounts of change in the electrostatic capacitances reach peaks as the Y coordinates of the proximity positions of the detection-target objects. This allows the control circuit 150 to designate the identified positions, which are constituted by combinations of the X coordinates and the Y coordinates, as candidates of the proximity positions. The control circuit 150 then can determine, as the actual proximity positions of the detection-target objects, positions that are included in the candidates of the proximity positions and that correspond to peaks in the amounts of change in the electrostatic capacitances of the detection electrodes A1 to A9 and correspond to peaks in the amounts of change in the electrostatic capacitances of the detection electrodes B1 to B9.

In the "single-point detection mode" in which the first detection electrode group X and the second detection electrode group Y that orthogonally cross each other are used, it is possible to perform collective detection of the electrostatic capacitances of the detection electrodes X1 to X5 included in the first detection electrode group X and collective detection of the electrostatic capacitances of the detection electrodes Y1 to Y5 included in the second detection electrode group Y. However, in the "single-point detection mode", when a plurality of detection-target objects comes into close proximity, the so-called "ghost" occurs, and thus there is a possibility that an erroneous proximity position is detected. Accordingly, when a plurality of detection-target objects is in close proximity, the mode of the proximity detecting device 100 according to one embodiment switches to the "multi-point detection mode" to use the third detection electrode group A and the fourth detection electrode group B, in addition to the first detection electrode group X and the second detection electrode group Y, thereby making it possible to ensure that such erroneous detection does not occur. Accordingly, the respective proximity positions of detection-target objects can be detected with high accuracy.

As shown in FIG. 2, the proximity detecting device 100 operates in the "idle mode" until the control circuit 150 determines that a detection-target object is in close proximity.

When the detecting circuit 120 detects close proximity of a detection-target object while the proximity detecting device 100 is operating in the "idle mode", the control circuit 150 switches the mode to the "single-point detection mode".

Also, when the detecting circuit 120 detects close proximity of a plurality of detection-target objects while the proximity detecting device 100 is operating in the "single-point detection mode", the control circuit 150 switches the mode to the "multi-point detection mode".

Also, when the detecting circuit 120 does not detect close proximity of a detection-target object while the proximity detecting device 100 is operating in the "single-point detection mode" or the "multi-point detection mode", the control circuit 150 switches the mode to the "idle mode".

<First Example of Operation Procedure for Proximity Detecting Device 100>

Figure 3:
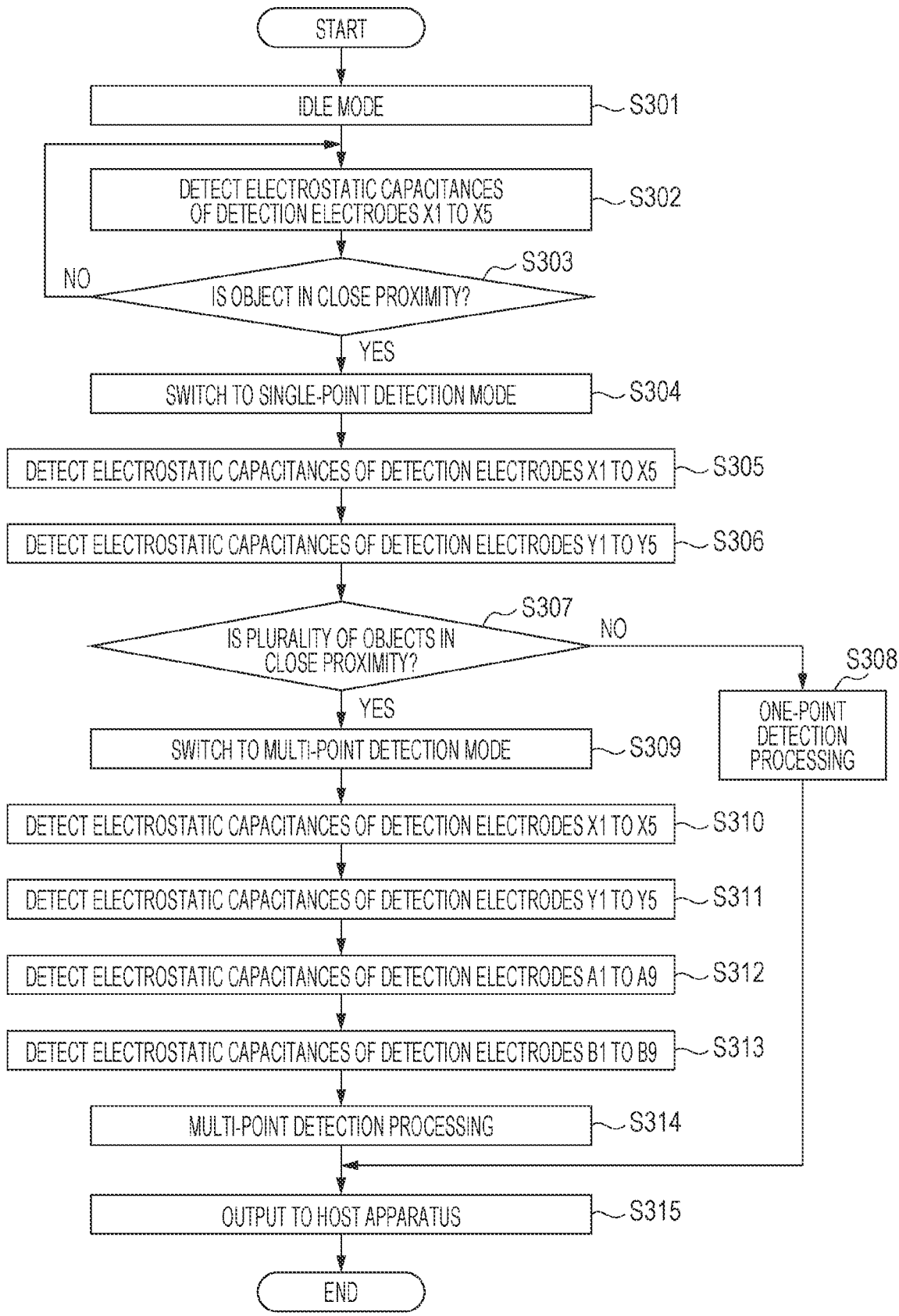
FIG. 3 is a flowchart showing a first example of an operation procedure for the proximity detecting device according to one embodiment.

FIG. 3 is a flowchart showing a first example of an operation procedure for the proximity detecting device 100 according to one embodiment.

First, the proximity detecting device 100 starts operation in the "idle mode" (step S301). In this "idle mode", the detecting circuit 120 detects the electrostatic capacitances of the first detection electrode group X (the detection electrodes X1 to X5) (step S302). The control circuit 150 determines whether or not a detection-target object is in close proximity to the detection surface 111, based on the electrostatic capacitances of the first detection electrode group X, the electrostatic capacitances being detected in step S302 (step S303).

When it is determined in step S303 that a detection-target object is not in close proximity (No in step S303), the proximity detecting device 100 returns the operation to step S302. On the other hand, when it is determined in step S303 that a detection-target object is in close proximity (Yes in step S303), the control circuit 150 switches the proximity detecting device 100 from the "idle mode" to the "single-point detection mode" (step S304).

In the "single-point detection mode", the detecting circuit 120 detects the electrostatic capacitances of the first detection electrode group X (the detection electrodes X1 to X5) (step S305). Also, the detecting circuit 120 detects the electrostatic capacitances of the second detection electrode group Y (the detection electrodes Y1 to Y5) (step S306). Then, based on the electrostatic capacitances of the first detection electrode group X, the electrostatic capacitances being detected in step S305, and the electrostatic capacitances of the second detection electrode group Y, the electrostatic capacitances being detected in step S306, the control circuit 150 determines whether or not a plurality of detection-target objects is in close proximity to the detection surface 111 (step S307).

When it is determined in step S307 that a plurality of detection-target objects is not in close proximity (No in step S307), the control circuit 150 performs processing (one-point detection processing) for determining a proximity state of one detection-target object relative to the detection surface 111, based on the electrostatic capacitances of the first detection electrode group X, the electrostatic capacitances being detected in step S305, and the electrostatic capacitances of the second detection electrode group Y, the electrostatic capacitances being detected in step S306 (step S308). The control circuit 150 then outputs data indicating the proximity state of one detection-target object, the proximity state being determined in step S308, to the host apparatus 200 (step S315), and the proximity detecting device 100 ends the series of processes shown in FIG. 3.

On the other hand, when it is determined in step S307 that a plurality of detection-target objects is in close proximity (Yes in step S307), the control circuit 150 switches the proximity detecting device 100 from the "single-point detection mode" to the "multi-point detection mode" (step S309).

In the "multi-point detection mode", the detecting circuit 120 detects the electrostatic capacitances of the first detection electrode group X (the detection electrodes X1 to X5) (step S310). Also, the detecting circuit 120 detects the electrostatic capacitances of the second detection electrode group Y (the detection electrodes Y1 to Y5) (step S311). Also, the detecting circuit 120 detects the electrostatic capacitances of the third detection electrode group A (the detection electrodes A1 to A9) (step S312). Also, the detecting circuit 120 detects the electrostatic capacitances of the fourth detection electrode group B (the detection electrodes B1 to B9) (step S313).

Then, the control circuit 150 performs processing (multi-point detection processing) for determining proximity states of the respective detection-target objects relative to the detection surface 111, based on the electrostatic capacitances of the first detection electrode group X, the electrostatic capacitances being detected in step S310, the electrostatic capacitances of the second detection electrode group Y, the electrostatic capacitances being detected in step S311, the electrostatic capacitances of the third detection electrode group A, the electrostatic capacitances being detected in step S312, and the electrostatic capacitances of the fourth detection electrode group B, the electrostatic capacitances being detected in the step S313 (step S314).

The control circuit 150 outputs data indicating the proximity states of the respective detection-target objects, the proximity states being determined in step S314, to the host apparatus 200 (step S315), and the proximity detecting device 100 ends the series of processes shown in FIG. 3.

<Second Example of Operation Procedure for Proximity Detecting Device 100>

Figure 4:
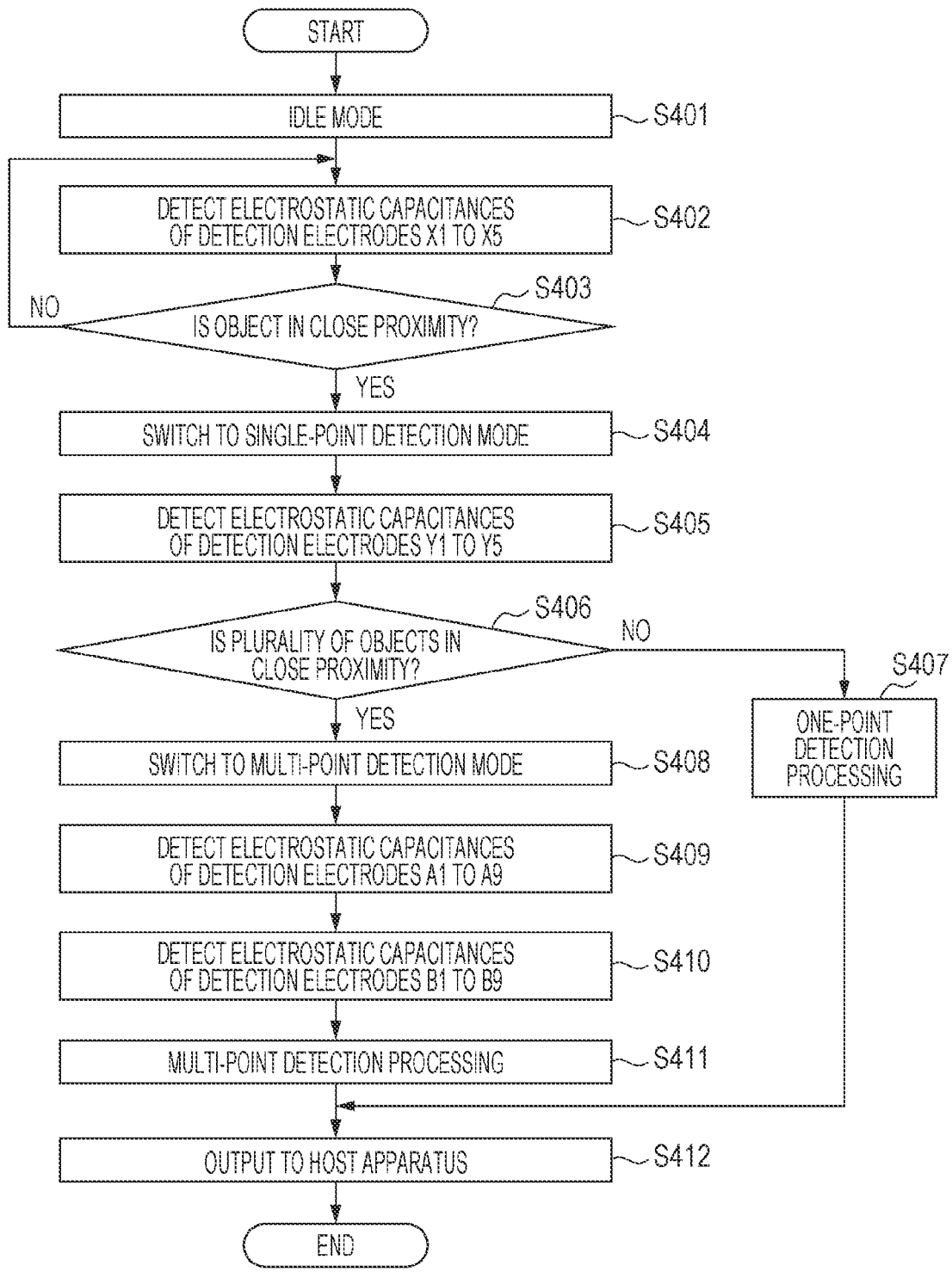
FIG. 4 is a flowchart showing a second example of the operation procedure for the proximity detecting device according to one embodiment.

FIG. 4 is a flowchart showing a second example of the operation procedure for the proximity detecting device 100 according to one embodiment.

First, the proximity detecting device 100 starts operation in the "idle mode" (step S401). In the "idle mode", the detecting circuit 120 detects the electrostatic capacitances of the first detection electrode group X (the detection electrodes X1 to X5) (step S402). Then, the control circuit 150 determines whether or not a detection-target object is in close proximity to the detection surface 111, based on the electrostatic capacitances of the first detection electrode group X, the electrostatic capacitances being detected in step S402 (step S403).

When it is determined in step S403 that a detection-target object is not in close proximity (No in step S403), the proximity detecting device 100 returns the operation to step S402. On the other hand, when it is determined in step S403 that a detection-target object is in close proximity (Yes in step S403), the control circuit 150 switches the proximity detecting device 100 from the "idle mode" to the "single-point detection mode" (step S404).

In the "single-point detection mode", the detecting circuit 120 detects the electrostatic capacitances of the second detection electrode group Y (the detection electrodes Y1 to Y5) (step S405). Based on the electrostatic capacitances of the first detection electrode group X, the electrostatic capacitances being detected in step S402 (that is, in the "idle mode"), and the electrostatic capacitances of the second detection electrode group Y, the electrostatic capacitances being detected in step S405 (that is, in the "single-point detection mode"), the control circuit 150 determines whether or not a plurality of detection-target objects is in close proximity to the detection surface 111 (step S406).

When it is determined in step S406 that a plurality of detection-target objects is not in close proximity (No in step S406), the control circuit 150 performs processing (one-point detection processing) for determining a proximity state of one detection-target object relative to the detection surface 111, based on the electrostatic capacitances of the first detection electrode group X, the electrostatic capacitances being detected in step S402 (that is, in the "idle mode"), and the electrostatic capacitances of the second detection electrode group Y, the electrostatic capacitances being detected in step S405 (that is, in the "single-point detection mode") (step S407). The control circuit 150 then outputs data indicating the proximity state of one detection-target object, the proximity state being determined in step S407, to the host apparatus 200 (step S412), and the proximity detecting device 100 ends the series of processes shown in FIG. 4.

On the other hand, when it is determined in step S406 that a plurality of detection-target objects is in close proximity (Yes in step S406), the control circuit 150 switches the proximity detecting device 100 from the "single-point detection mode" to the "multi-point detection mode" (step S408).

In the "multi-point detection mode", the detecting circuit 120 detects the electrostatic capacitances of the third detection electrode group A (the detection electrodes A1 to A9) (step S409). Also, the detecting circuit 120 detects the electrostatic capacitances of the fourth detection electrode group B (the detection electrodes B1 to B9) (step S410).

The control circuit 150 performs processing (multi-point detection processing) for determining proximity states of the respective detection-target objects relative to the detection surface 111, based on the electrostatic capacitances of the first detection electrode group X, the electrostatic capacitances being detected in step S402 (that is, in the "idle mode"), the electrostatic capacitances of the second detection electrode group Y, the electrostatic capacitances being detected in step S405 (that is, in the "single-point detection mode"), the electrostatic capacitances of the third detection electrode group A, the electrostatic capacitances being detected in step S409 (that is, in the "multi-point detection mode"), and the electrostatic capacitances of the fourth detection electrode group B, the electrostatic capacitances being detected in step S410 (that is, in the "multi-point detection mode") (step S411).

The control circuit 150 then outputs data indicating the proximity states of the respective detection-target objects, the proximity states being determined in step S411, to the host apparatus 200 (step S412), and the proximity detecting device 100 ends the series of processes shown in FIG. 4. The series of operations may be repeated by returning the operation to the idle mode, as appropriate.

Comparative Example

A comparative example of comparison between the proximity detecting device 100 according to one embodiment and a related technology will be described with reference to FIG. 5. FIG. 5 is a chart for describing a comparative example of comparison between the proximity detecting device 100 according to one embodiment and a related technology. FIG. 5 is a time chart showing the order of processes for detecting proximity states of detection-target objects with respect to each of the proximity detecting device 100 according to one embodiment and a related technology.

In this comparative example, a detecting device that has a plurality of X-axis electrodes (corresponding to the "detection electrodes X1 to X5" in the proximity detecting device 100) and a plurality of Y-axis electrodes (corresponding to the "detection electrodes Y1 to Y5" in the proximity detecting device 100) that are arranged in a grid shape is used as the related technology. The detecting device can switch between an "idle mode" and a "multi-point detection mode". The detecting device uses a self-capacitance system to detect a detection-target object in the "idle mode" and uses a mutual-capacitance system to detect each detection-target object in the "multi-point detection mode".

As shown in FIG. 5, in the "idle mode", each of the proximity detecting device 100 and the related technology detects that a detection-target object is in close proximity with the plurality of X-axis electrodes by using a self-capacitance system. In this case, in each of the proximity detecting device 100 and the related technology, a detection-target object is detected at a detection cycle that has regular time intervals at which the plurality of X-axis electrode is not driven, to thereby achieve low power consumption.

As shown in FIG. 5, in the related technology, when close proximity of a detection-target object is detected in the "idle mode", the mode is switched to the "multi-point detection mode". Then, in the related technology, in the "multi-point detection mode", a mutual-capacitance system is used to detect a proximity state of a detection-target object with the plurality of X-axis electrodes and the plurality of Y-axis electrodes. Specifically, in the related technology, the X-axis electrodes are sequentially driven one by one, and each time one X-axis electrode is driven, the plurality of Y-axis electrodes is driven at a time. Accordingly, in the related technology, when the detecting device has n X-axis electrodes, as shown in FIG. 5, n detection sequences need to be sequentially performed. Accordingly, in the related technology, the processing time in the "multi-point detection mode" increases, as the number of X-axis electrodes increases. In the related technology, for detecting one detection-target object and even for detecting a plurality of detection-target objects, n detection sequences need to be sequentially performed.

On the other hand, upon detecting close proximity of a detection-target object in the "idle mode", the proximity detecting device 100 (the first example) is switched to the "single-point detection mode", as shown in FIG. 5. Then, in the "single-point detection mode", the proximity detecting device 100 (the first example) detects a proximity state of a detection-target object with the plurality of X-axis electrodes and the plurality of Y-axis electrodes by using a self-capacitance system. Specifically, the proximity detecting device 100 (the first example) drives the plurality of X-axis electrodes at a time to collectively detect the electrostatic capacitances of the X-axis electrodes and then drives the plurality of Y-axis electrodes at a time to collectively detect the electrostatic capacitances of the Y-axis electrodes. This allows the proximity detecting device 100 (the first example) to determine a proximity state of one detection-target object. That is, when the number of detection-target objects is one, the proximity detecting device 100 (the first example) can determine a proximity state of one detection-target object by performing two detection sequences in the "single-point detection mode". Hence, compared with the related technology in which n detection sequences need to be performed, the proximity detecting device 100 (the first example) can determine a proximity state of one detection-target object in a shorter time.

Also, upon detecting a plurality of detection-target objects in the "single-point detection mode", the proximity detecting device 100 (the first example) is switched to the "multi-point detection mode". Then, in this "multi-point detection mode", the proximity detecting device 100 (the first example) detects proximity states of detection-target objects with the plurality of X-axis electrodes, the plurality of Y-axis electrodes, the plurality of A-axis electrodes, and the plurality of Y-axis electrodes by using a self-capacitance system. Specifically, the proximity detecting device 100 (the first example) drives the plurality of X-axis electrodes at a time to collectively detect the electrostatic capacitances of the X-axis electrodes and then drives the plurality of Y-axis electrodes at a time to collectively detect the electrostatic capacitances of the Y-axis electrodes. Subsequently, the proximity detecting device 100 (the first example) drives the plurality of A-axis electrodes at a time to collectively detect the electrostatic capacitances of the A-axis electrodes and then drives the plurality of B-axis electrodes at a time to collectively detect the electrostatic capacitances of the B-axis electrodes. This allows the proximity detecting device 100 (the first example) to determine proximity states of the respective detection-target objects. That is, when the number of detection-target objects is two or more, the proximity detecting device 100 (the first example) can determine proximity states of the respective detection-target objects by performing four detection sequences in the "multi-point detection mode". Hence, compared with the related technology in which n detection sequences need to be performed, the proximity detecting device 100 (the first example) can determine proximity states of respective detection-target objects in a shorter time.

Also, upon detecting close proximity of a detection-target object in the "idle mode", the proximity detecting device 100 (the second example) is switched to the "single-point detection mode", as shown in FIG. 5. Then, the proximity detecting device 100 (the second example) detects the electrostatic capacitances of only the plurality of Y-axis electrodes in the "single-point detection mode" and can determine a proximity state of one detection-target object based on the electrostatic capacitances of the X-axis electrodes, the electrostatic capacitances being detected in the "idle mode", and the electrostatic capacitances of the Y-axis electrodes, the electrostatic capacitances being detected in the "single-point detection mode". That is, when the number of detection-target objects is one, the proximity detecting device 100 (the second example) can determine a proximity state of one detection-target object by performing one detection sequence in the "single-point detection mode". Hence, compared with the related technology in which n detection sequences need to be performed, the proximity detecting device 100 (the second example) can determine a proximity state of one detection-target object in a shorter time.

Also, upon detecting a plurality of detection-target objects in the "single-point detection mode", the proximity detecting device 100 (the second example) is switched to the "multi-point detection mode". Then, in the "multi-point detection mode", after collectively detecting the electrostatic capacitances of the A-axis electrodes, the proximity detecting device 100 (the second example) collectively detects the electrostatic capacitances of the B-axis electrodes. Then, the proximity detecting device 100 (the second example) can determine proximity states of the respective detection-target objects, based on the electrostatic capacitances of the X-axis electrodes, the electrostatic capacitances being detected in the "idle mode", the electrostatic capacitances of the Y-axis electrodes, the electrostatic capacitances being detected in the "single-point detection mode", and the electrostatic capacitances of the A-axis electrodes and the B-axis electrodes, the electrostatic capacitances being detected in the "multi-point detection mode". That is, when the number of detection-target objects is two or more, the proximity detecting device 100 (the second example) can determine proximity states of respective detection-target objects by performing two detection sequences in the "multi-point detection mode". Hence, compared with the related technology in which n detection sequences need to be performed, the proximity detecting device 100 (the second example) can determine proximity states of respective detection-target objects in a shorter time.

As described above, the proximity detecting device 100 according to one embodiment includes: the first detection electrode group X having the plurality of detection electrodes X1 to X5; the second detection electrode group Y having the plurality of detection electrodes Y1 to Y5 that orthogonally crosses the first detection electrode group X; the detection electrode groups A and B having the plurality of detection electrodes A1 to A9 and B1 to B9 that obliquely crosses each of the first detection electrode group X and the second detection electrode group Y; the detecting circuit 120 that is capable of detecting electrostatic capacitances according to a proximity state of a detection-target object for each of the detection electrode groups X, Y, A, and B; and the control circuit 150 that performs detection through switching between the "single-point detection mode" (the first detection mode) in which a proximity state of one detection-target object is determined based on the electrostatic capacitances of each of the first detection electrode group X and the second detection electrode group Y and the "multi-point detection mode" (the second detection mode) in which a proximity state of each of a plurality of detection-target objects is determined based on the electrostatic capacitances of each of the detection electrode groups X, Y, A, and B.

Thus, since the proximity detecting device 100 according to one embodiment performs detection using only the detection electrode groups X and Y when the number of detection-target objects is one, a proximity state of one detection-target object can be detected at high speed and with low power consumption. Also, since the proximity detecting device 100 according to one embodiment performs detection using the detection electrode groups A and B in addition to the detection electrode groups X and Y when the number of detection-target objects is two or more, proximity states of respective detection-target objects can be detected with high accuracy. Therefore, according to the proximity detecting device 100 according to one embodiment, proximity states of respective detection-target objects can be detected at high speed and with high accuracy.

Also, in the proximity detecting device 100 according to one embodiment, in the "single-point detection mode", the control circuit 150 maintains the "single-point detection mode" until a plurality of detection-target objects is detected with the first detection electrode group X, and in the "single-point detection mode", the control circuit 150 switches the proximity detecting device 100 to the "multi-point detection mode" when a plurality of detection-target objects is detected with the first detection electrode group X.

Thus, the proximity detecting device 100 according to one embodiment can operate in the "single-point detection mode" in which the detection is performed at high speed and with low power consumption, until a plurality of detection-target objects comes into close proximity to the detection surface, and can operate in the "multi-point detection mode" in which the detection is performed with high accuracy, when a plurality of detection-target objects comes into close proximity to the detection surface. Therefore, according to the proximity detecting device 100 according to one embodiment, a proximity state of each detection-target object can be detected at high speed and with high accuracy.

Also, in the proximity detecting device 100 according to one embodiment, in the "multi-point detection mode", the control circuit 150 determines proximity states of respective detection-target objects, based on the electrostatic capacitances of the first detection electrode group X and the second detection electrode group Y, the electrostatic capacitances being detected in the "single-point detection mode", and the electrostatic capacitances of the detection electrode groups A and B, the electrostatic capacitances being detected in the "multi-point detection mode".

Thus, in the proximity detecting device 100 according to one embodiment, detection operations using the first detection electrode group X and the second detection electrode group Y can be omitted in the "multi-point detection mode". Therefore, according to the proximity detecting device 100 according to one embodiment, proximity states of detection-target objects can be detected at higher speed.

Also, the proximity detecting device 100 according to one embodiment further has the "idle mode" (the third detection mode) in which whether or not a detection-target object is in close proximity is determined based on the electrostatic capacitances of the first detection electrode group X. In the "idle mode", the control circuit 150 maintains the "idle mode" until it is determined that a detection-target object is in close proximity, and in the "idle mode", the control circuit 150 switches to the "single-point detection mode" when it is determined that a detection-target object is in close proximity.

Thus, since it is sufficient for the proximity detecting device 100 according to one embodiment to only determine whether or not a detection-target object is in close proximity during standby until a detection-target object comes into close proximity to the detection surface, for example, it is possible to increase the intervals of detection using the first detection electrode group X. Accordingly, it is possible to realize low power consumption.

Also, in the proximity detecting device 100 according to one embodiment, in the "single-point detection mode", the control circuit 150 determines a proximity state of one detection-target object, based on the electrostatic capacitances of the first detection electrode group X, the electrostatic capacitances being detected in the "idle mode", and the electrostatic capacitances of the second detection electrode group Y, the electrostatic capacitances being detected in the "single-point detection mode".

Thus, in the proximity detecting device 100 according to one embodiment, the detection operation performed by the first detection electrode group X can be omitted in the "single-point detection mode". Therefore, the proximity detecting device 100 according to one embodiment can detect a proximity state of each detection-target object at higher speed.

Also, in the proximity detecting device 100 according to one embodiment, the detecting circuit 120 detects electrostatic capacitances for each of the detection electrode groups X, Y, A, and B by using a self-capacitance system.

This allows the proximity detecting device 100 according to one embodiment to have a relatively simple configuration for the electrode configuration of the detection electrodes and to perform driving of the detection electrodes at a time and collective detection of electrostatic capacitances, thus making it possible to detect a proximity state of each detection-target object at higher speed.

Although one embodiment of the present invention has been described above in detail, the present invention is not limited to the above embodiment, and various modifications and changes can be made thereto within the scope of the spirit of the present invention recited in the claims. For example, in the embodiment described above, although two detection electrode groups A and B are used as an example of the "obliquely crossing detection electrode groups", the number of detection electrode groups is not limited thereto, and three or more detection electrode groups may be used as the "obliquely crossing detection electrode groups".

What is claimed is:

1. A proximity detecting device comprising:
a first detection electrode group having a plurality of detection electrodes each extending in a first direction;
a second detection electrode group having a plurality of detection electrodes each extending in a second direction which orthogonally crosses the first direction;
a third detection electrode group having a plurality of detection electrodes each extending in a third direction which obliquely crosses each of the first direction and the second direction;
a detector configured to detect electrostatic capacitances corresponding to a proximity state of at least one detection-target object with respect to each of the first, second, and third detection electrode groups; and
a controller configured to perform proximity state detection by switching between a first detection mode, a second detection mode, and a third detection mode,
wherein in the first detection mode, the proximity state of a detection-target object is determined based on the electrostatic capacitances of each of the first detection electrode group and the second detection electrode group; in the second detection mode, a proximity state of each of a plurality of detection-target objects is determined based on the electrostatic capacitances of each of the first detection electrode group, the second detection electrode group, and the third detection electrode group; and in the third detection mode, whether any detection-target object is in close proximity or not is determined based on the electrostatic capacitances of either one of the first detection electrode group and the second detection electrode group,
and wherein the controller is further configured to maintain the first detection mode until existence of a plurality of detection-target objects is detected with at least one of the first detection electrode group and the second detection electrode group, and to switch from the first detection mode to the second detection mode if the existence of the plurality of detection-target objects is detected in the first detection mode; to determine the proximity state of each of the plurality of detection-target objects in the second detection mode based on the electrostatic capacitances of each of the first detection electrode group and the second detection electrode group which have been detected in the first detection mode, and the electrostatic capacitances of the third detection electrode group which is detected in the second detection mode; and to maintain the third detection mode until at least one detection-target object is detected in close proximity, and to switch from the third operation mode to the first detection mode if the at least one detection-target object is detected in close proximity.

2. The proximity detecting device according to claim 1, wherein the controller is further configured to determine the proximity state of the detection-target object in the first detection mode based on the electrostatic capacitances of the one of the first detection electrode group and the second detection electrode group which have been detected in the third detection mode, and the electrostatic capacitances of the other of the first detection electrode group and the second detection electrode group detected in the first detection mode.

3. The proximity detecting device according to claim 1, wherein the electrostatic capacitances detected for each of the first detection electrode group, the second detection electrode group, and the third detection electrode group are self-capacitances.

4. The proximity detecting device according to claim 1, wherein the at least one detection-target object is a hand or finger of an operator.

5. The proximity detecting device according to claim 4, wherein the first detection mode is a single-point detection mode which determines a proximity state of the hand or finger as the detection-target object.

6. The proximity detecting device according to claim 5, wherein the second detection mode is a multi-point detection mode which determines a plurality of fingers as the plurality of detection-target objects.

\* \* \* \* \*